United States Patent
Wilson et al.

(10) Patent No.: US 6,840,597 B1
(45) Date of Patent: Jan. 11, 2005

(54) COLOR CALIBRATION IN AN INKJET PRINTER

(75) Inventors: Karsten N. Wilson, Corvallis, OR (US); Nancy L. Herald, Corvallis, OR (US); John M Skene, Lake Oswego, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/183,120

(22) Filed: Oct. 30, 1998

(51) Int. Cl.[7] .............................. B41J 29/393; B41J 2/21
(52) U.S. Cl. ............................................. 347/19; 347/43
(58) Field of Search .............................. 347/19, 43, 15, 347/14, 23, 12; 382/167; 358/518, 500, 504

(56) References Cited

U.S. PATENT DOCUMENTS

| | | | |
|---|---|---|---|
| 4,706,130 A | * 11/1987 | Yamakawa | ................. 358/296 |
| 4,999,646 A | 3/1991 | Trask | ........................... 346/11 |
| 5,272,503 A | 12/1993 | LeSueur et al. | ............. 355/208 |
| 5,387,976 A | * 2/1995 | Lesniak | ...................... 356/379 |
| 5,448,269 A | * 9/1995 | Beauchamp et al. | .......... 347/19 |
| 5,508,826 A | * 4/1996 | Lloyd et al. | .................. 347/43 |
| 5,812,156 A | 9/1998 | Bullock et al. | ............. 347/708 |
| 6,128,090 A | * 10/2000 | Hunsel et al. | .............. 356/402 |
| 6,243,110 B1 | * 6/2001 | Takahashi et al. | ............. 347/5 |

* cited by examiner

*Primary Examiner*—John Barlow
*Assistant Examiner*—Charles W. Stewart, Jr.

(57) ABSTRACT

A method and apparatus for calibrating color in an inkjet printing system initiates a calibration procedure by instructing an inkjet printer to print a color calibration sample. From the color calibration sample, an analysis is performed to select a color calibration based on the sample. Based on the characteristics of the selected color calibration, the color of the inkjet printer is calibrated.

33 Claims, 8 Drawing Sheets

(2 of 8 Drawing Sheet(s) Filed in Color)

COLOR CALIBRATION IN AN INKJET PRINTER

FIELD OF THE INVENTION

This invention relates to printers and, more particularly, to a method and apparatus for calibrating color in an inkjet printer.

BACKGROUND OF THE INVENTION

The inkjet printers of today typically use a multi-color printing system. Borders and text are often created with a black printhead, while colors are created by mixing or combining dots from a Black (K), a Cyan (C), a Magenta (M), and a Yellow (Y) printhead.

Drop volume is one measure of a quantity of ink as ejected from an ink nozzle during a single firing. This may also be expressed as "drop weight", which is the weight of the quantity of ink ejected from an ink nozzle during a single firing. Although this value is reasonably constant for each printhead, it is nearly impossible to manufacture these printheads such that they are exactly the same drop volume every time. Naturally, for print quality control, a narrow range of drop volume, or drop weight, values is acceptable for each printhead. But even with this narrow control range, if one color is on the high end of its acceptable range and another color of printhead is on the low end of its acceptable range, the resultant color may not be the color the user was expecting. For example, if the Cyan printhead is on the high end of its acceptable range, and the Yellow printhead is on the low end of its acceptable range, and the desired color is a true green, the color produced will most likely look more blue-green than true green.

Drop volume/drop weight variations can also be a result of environmental changes to the ink supply, thereby changing the characteristics of the ink; environmental changes to the components of the printhead, both while in storage and in the printer; or from build up of ink in and around the ink firing chambers and nozzles, lessening the volume of ink available to be fired. If any one of the color printheads experiences change in drop volume/drop weight, the result will be a hue, or gradation of color, shift toward the color of the printhead having the higher drop volume.

To minimize the manufacturing variations, a tighter manufacturing tolerance could be enforced. Unfortunately, this typically results in an increased cost to manufacture the printheads. To lessen the environmental effects while the printheads are in the printer, more environmental control (e.g., temperature, humidity, etc.) could be implemented in the printer. This, however, would add to the component and manufacturing costs of the printer and limit its usefulness to only tightly controlled environments.

With the increasing use of inkjet printers for photo quality color printing in the home and in the office, it is desirable for the user to have the ability to calibrate the color in their printer to achieve the "true colors" they desire. Whether the correction is necessary for the above mentioned drop volume/drop weight variations or for personal color preferences of the user, the solution should to be of little or no expense to the user and easily implemented.

SUMMARY OF THE INVENTION

A method and apparatus for calibrating color in an inkjet printing system initiates a calibration procedure by instructing an inkjet printer to print a color calibration sample. From the color calibration sample, an analysis is performed to select a color calibration based on the sample. Based on the characteristics of the selected color calibration, the color of the inkjet printer is calibrated.

BRIEF DESCRIPTION OF THE DRAWINGS

The file of this patent contains at least one drawing executed in color. Copies of this patent with color drawing(s) will be provided by the Office upon request and payment of the necessary fee.

DETAILED DESCRIPTION OF A PREFERRED EMBODIMENT

Figure 1:
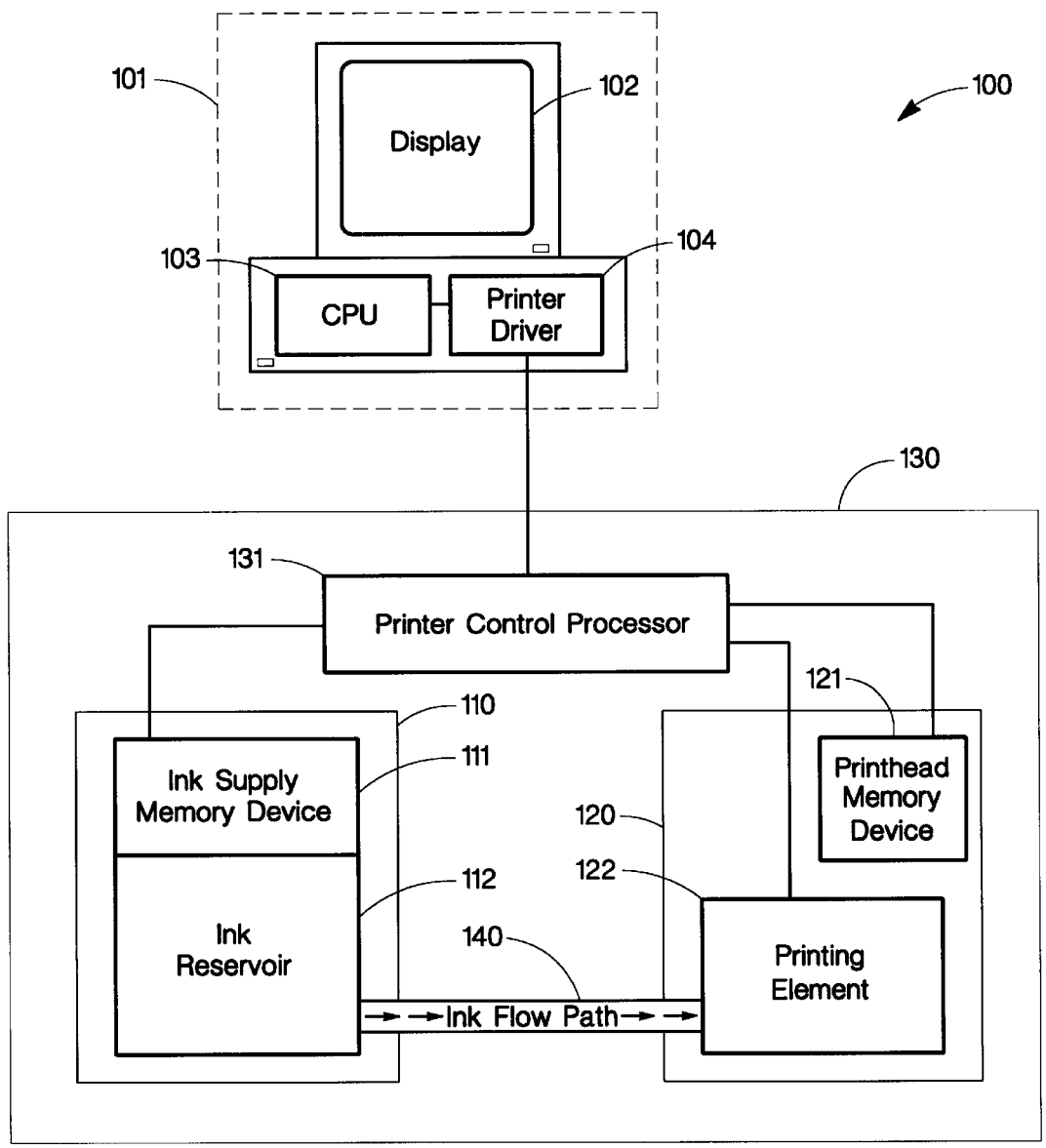
FIG. 1 is a computer controlled inkjet printing system in the preferred embodiment of the invention.

FIG. 1 shows a computer controlled inkjet printing system 100 in the preferred embodiment of the present invention. A computer 101 has a display 102, a Central Processing Unit 103 (hereinafter, "CPU 103"), and a printer driver 104 in communication with CPU 103. Computer 101 is shown connected to an inkjet printer 130. Inkjet printer 130 has an ink supply 110 that includes an ink supply memory device 111 and an ink reservoir 112; a printhead 120 that includes a printing element 122 and a printhead memory device 121; and, a printer control processor 131 which is capable of reading data stored on printhead memory device 121 and ink supply memory device 111 in order to maximize performance of inkjet printer 130.

Ink supply 110 has data in ink supply memory device 111 based on characteristics of the ink that is contained in ink reservoir 112, such as color, as well as characteristics of the ink reservoir 112, such as size. In the preferred embodiment, when ink supply 110 is inserted into inkjet printer 130, the data stored in ink supply memory device 111 is loaded into printer control processor 131. Likewise, the data stored in printhead memory device 121 of inkjet printhead 120 is loaded into printer control processor 131 upon insertion of inkjet printhead 120 into inkjet printer 130. The data stored in printhead memory device 121 is based primarily on the characteristics of printing element 122. Ink reservoir 112 is connected to printing element 112 by a tube, or other fluid interface, creating ink flow path 140.

In an alternate embodiment, ink supply 110 and inkjet printhead 120 would be integrated into one unit or cartridge, and would use only one memory device to store all data and characteristics of the printhead and the ink supply. Another alternate embodiment has been contemplated where multiple ink supplies supply one printhead.

In the preferred embodiment, ink supply characteristics stored in ink supply memory device 111 are used with inkjet printhead 120 characteristics stored in printhead memory device 121 to optimize print quality. An example of a characteristic of printing element 112 that is loaded into the printhead memory device 121 is ink drop volume.

Ink supply 110 supplies ink from ink reservoir 112 for printing on media to printing element 122 through an ink flow path 140. Printing is executed when CPU 103 sends a print command to printer driver 104 and printer driver 104 sends an instruction set to printer control processor 131. Printer control processor 131 then instructs printing element 122 to print the desired characters or graphics.

In the color inkjet printer of the preferred embodiment, there are four separate ink supplies 110 (preferably a Black (K), a Cyan (C), a Magenta (M), and a Yellow (Y)) each attached to a separate printhead 120. As previously discussed, each printing element 122 has a characteristic called ink "drop volume" or "drop weight" (collectively referred to herein as "drop quantity") that is associated with it. Drop quantity is a measurement of the amount of ink in one firing. This measurement is taken at the final stage of the manufacturing process of the inkjet printhead 120 by expelling droplets of ink onto a measurement device. This measured drop quantity is then encoded in printhead memory device 121. A high drop quantity printhead 120 will create larger drops on the page than a low drop quantity printhead 120. There is a narrow range of drop quantities acceptable for each color of printhead 120. The importance of drop quantity control is that each color printed by inkjet printer 130 is constructed from the combining of one or more of the Black, Cyan, Magenta, and Yellow inks. With uncontrolled variation in drop quantity, the resulting colors will vary from printing system to printing system. What may be a true red in one printing system may appear more orange in another printing system where the yellow printhead has a drop quantity on the high end of the range of acceptable drop quantities.

Upon insertion of a new ink supply 110 or a new printhead 120, printer control processor 131 reads the respective memory devices, 111 or 121. Based on this data, a drop quantity value from printhead memory device 121 is assigned to each printhead 120 in the inkjet printer 130. These assigned drop quantity values are encoded in the printer driver 104 and are the default drop quantity values that will be used throughout the life of the printhead unless overridden by a color calibration operation.

Figure 2:
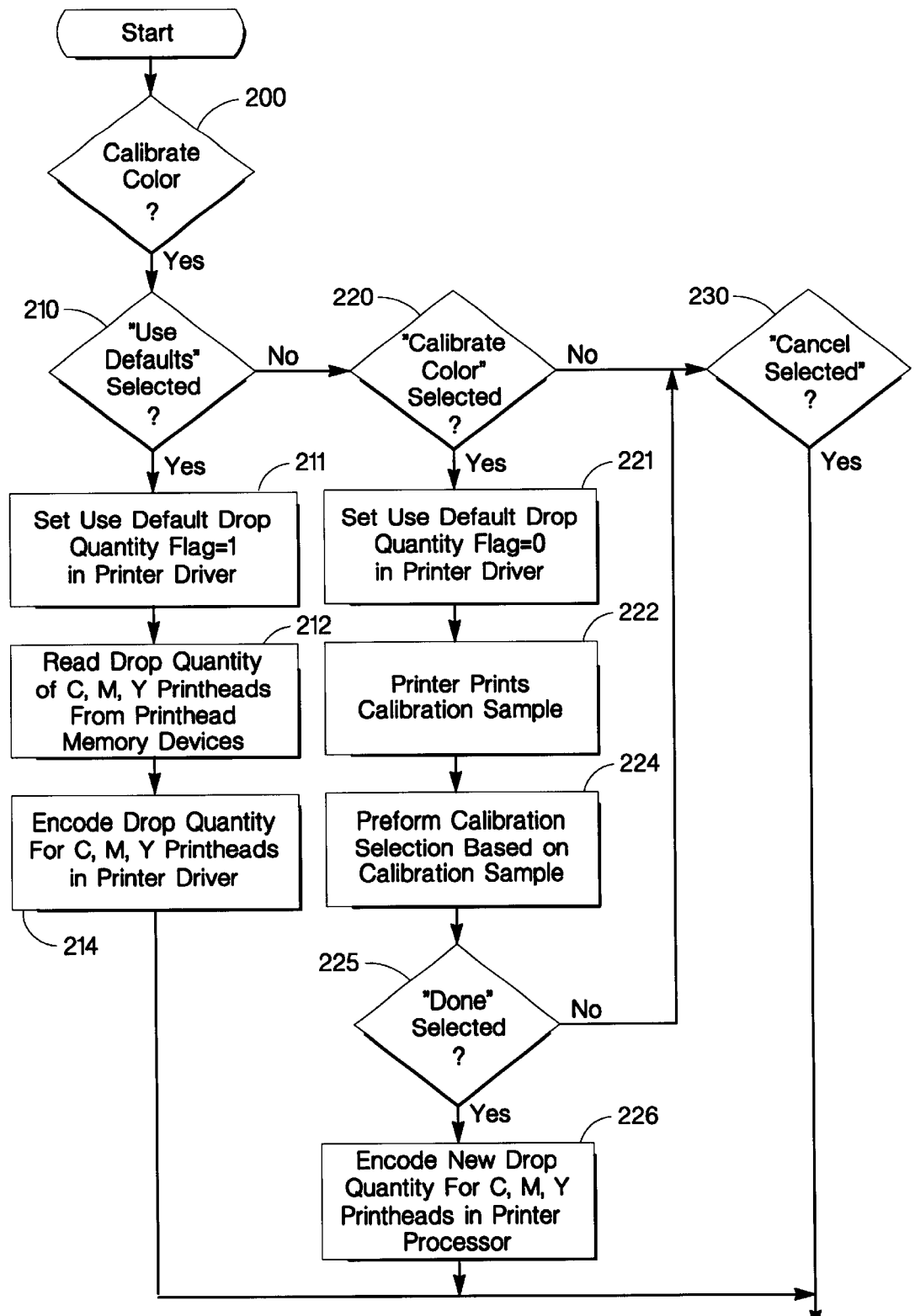
FIG. 2 is a representation of the flowchart of the method of calibrating color in an inkjet printing system according to the preferred embodiment of the present invention.

FIG. 2 is a representation of the flowchart of the method of calibrating color in an inkjet printing system according to the preferred embodiment of the present invention. The process begins in block 200 with the initiation of the color calibration routine in the printer software associated with printer driver 104 (FIG. 1). By selecting "Use Defaults" as represented by block 210, control moves to block 211 where the Use Default Drop Quantity Flag is set to "1" in printer driver 104. Control moves to block 212 where the drop quantity values for the Cyan, Magenta, and Yellow printheads are read from the printhead memory device 121 of each printhead by printer process controller 131. These values are encoded in printer driver 104 and are the default values of drop quantity of each printhead 120 installed in inkjet printer 130.

If block 220 "Calibrate Color" is selected, control moves to block 221 where the Use Default Drop Quantity Flag is set to "0" in printer driver 104. Control moves to block 222 where printer 130 is requested to print a color calibration sample for color analysis. In block 224, a calibration selection is made based on the color output of the calibration sample. In the preferred embodiment, a matrix of choices is provided for the user's selection. This will be shown and discussed in detail in later figures. After the calibration selection is made, the selection of "Done" in block 225, will execute the encoding of the new drop quantities for each printhead in printer process controller 131 based on the calibration selection as indicated in block 226. However, the optional "Cancel" choice, block 230, which can be selected at any time during the color calibration routine, will terminate the color calibration routine and the drop quantity settings for each printhead will remain as they were prior to the initiation of the Calibrate Color program.

Figure 3:
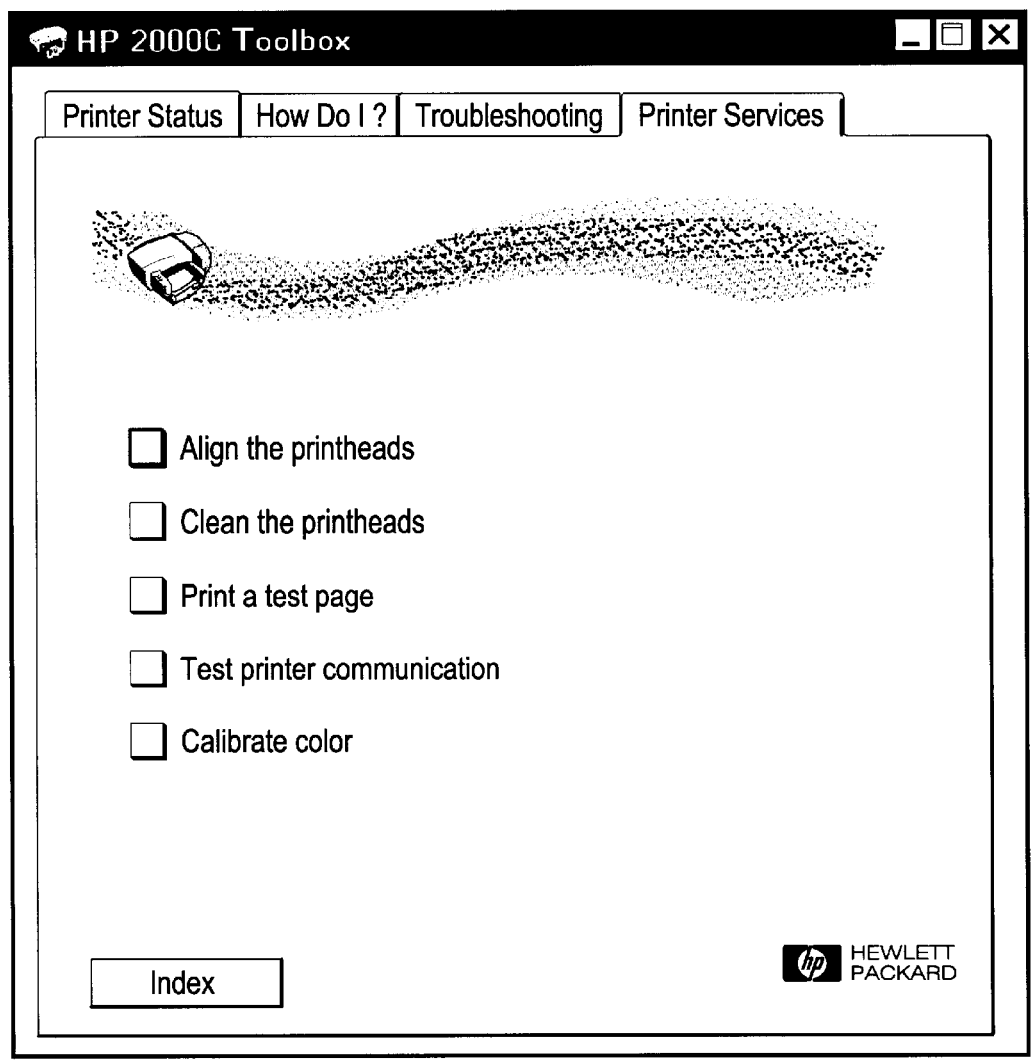
FIG. 3 and FIG. 4 are the initial steps in a sequence of printer toolbox screens that enable color calibration in an inkjet printer in the preferred embodiment.

As an example of the preferred embodiment, FIG. 3 through FIG. 6 are graphical representations of the color calibration procedure as implemented on the Hewlett-Packard 2000C (HP 2000C) Inkjet Printer. As is typical with inkjet products, there is a procedure for testing, aligning, and cleaning the printheads within the printer maintenance software included with the inkjet printer. In the HP 2000C, however, there is an additional option called "Calibrate" located in the Printer Services menu within the HP 2000C Printer Toolbox. This menu is shown in FIG. 3.

Figure 4:
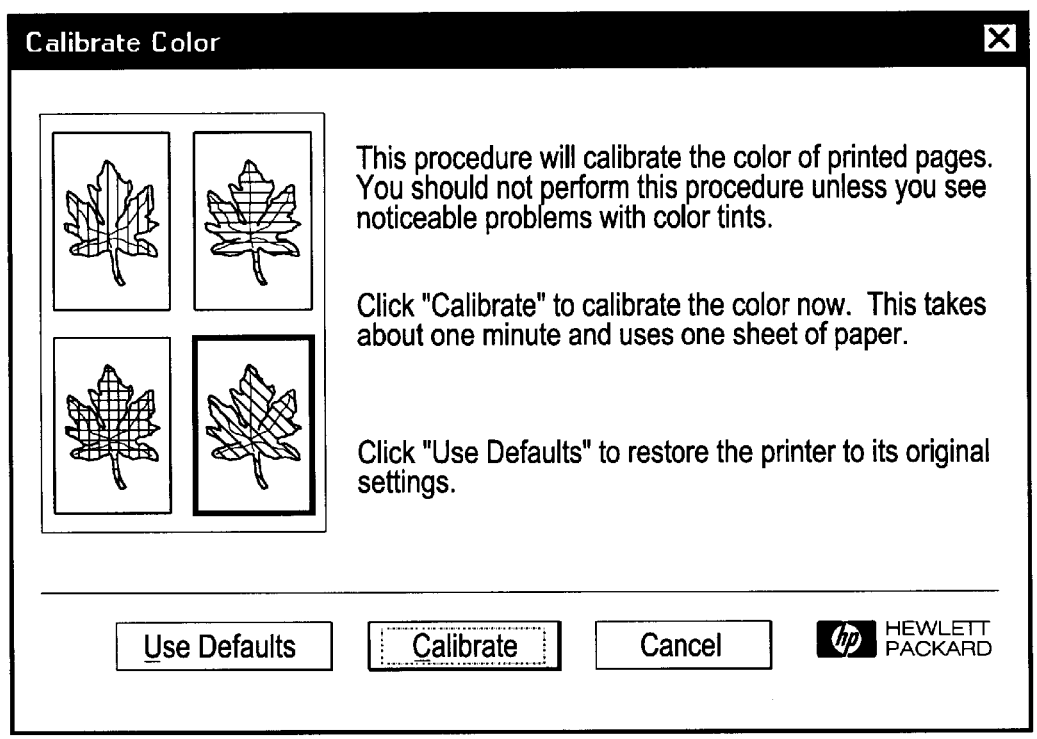

FIG. 4 shows the Calibrate Color screen of the HP 2000C Printer. In the event the user wants to restore the default drop quantity values as measured during manufacturing, the user selects "Use Defaults", and the drop quantity values in printer driver 104 will be restored to their originally installed settings. By selecting "Cancel", the color calibration procedure is aborted and the drop quantity setting of each printhead is left at its value prior to calibration. By choosing "Calibrate" from the Calibrate Color screen, a calibration sample (see FIG. 5) is printed with the HP 2000C printer.

Figure 5:
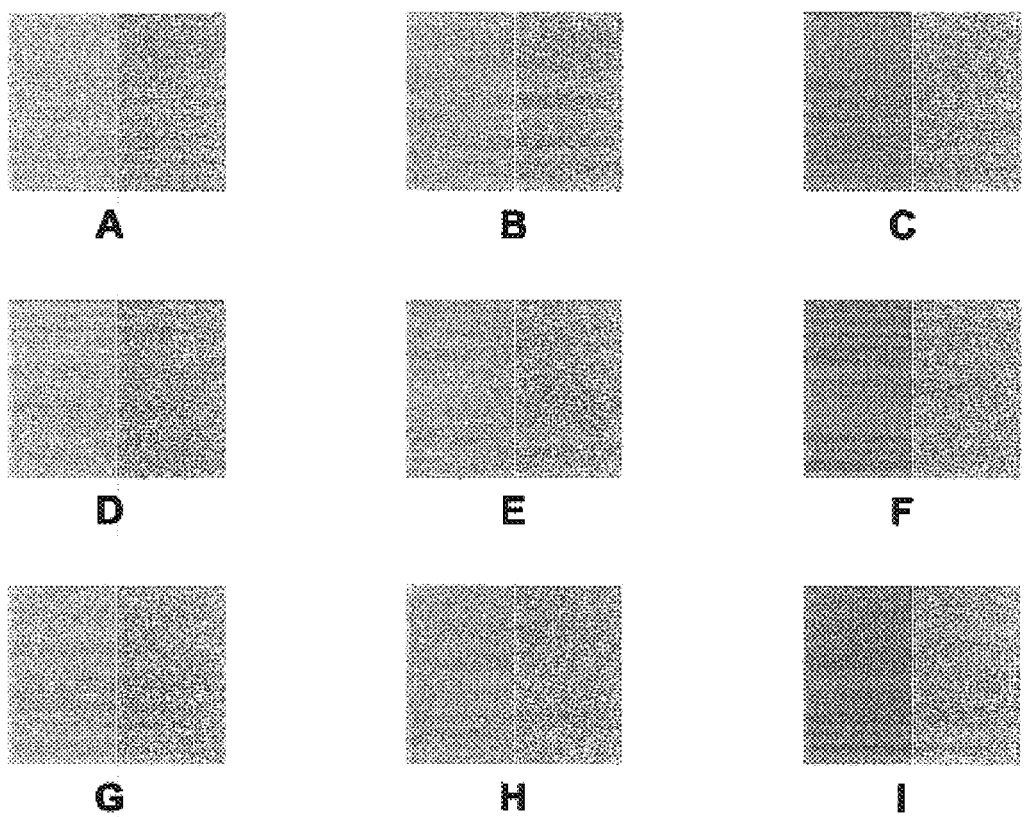
FIG. 5 is a color output of a calibration sample of the preferred embodiment printed by an inkjet printer upon request to calibrate color.

The printed calibration sample of the preferred embodiment shown in FIG. 5 is a three by three matrix of pairs of calibration squares. The right square of each pair is a shade of gray which is printed with the black printhead. All of the right squares are preferably the same shade or color of gray. The left square of each pair is a composite gray produced by the combining of a plurality of colored inks, such as from a Cyan, a Magenta, and a Yellow printhead. The matrix is produced by having a first printhead held at a constant drop quantity for all nine pairs of squares; with a second printhead varying from a lower drop quantity in the left column of pairs to a median drop quantity in the center column of pairs, then to a higher drop quantity in the right column of pairs; and, with a third printhead varying from a lower drop quantity in the top row of pairs to a median drop quantity in the second row of pairs, and a higher drop quantity in the bottom row of pairs. With the drop quantities of the three colored printheads properly balanced, the resulting composite gray in at least one of the samples will be of a similar shade to that produced by the black printhead.

Although the preferred embodiment shows the printed calibration sample with the Cyan (as first printhead) held at a constant drop quantity while varying the Magenta (as second printhead) and Yellow (as third printhead), it has been contemplated that any one of the three printheads could be held constant with the other two varying in levels of drop quantity to perform the color calibration procedure. This is done to make it easier for a user to select the proper color calibration from a manageable number of choices. However, in an alternate embodiment, the drop quantity values of all the printheads could be varied any number of levels and the resulting matrix would be of the size (# of variations of drop quantities)$^{\text{\# of printheads varying}}$. For example, for a three-printhead system with three drop quantity variations, there would be $3^3$ or 27 sample pairs.

Figure 6:
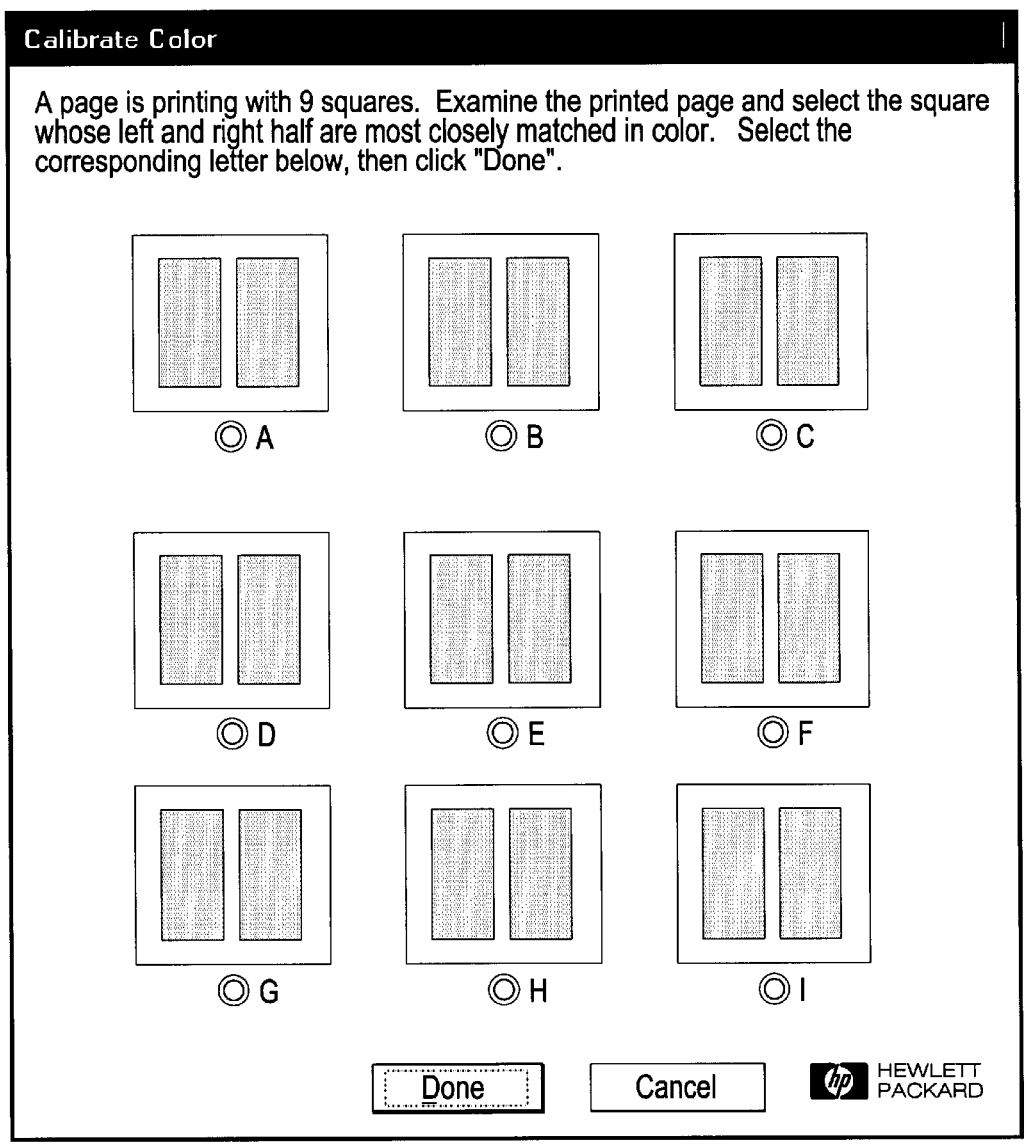
FIG. 6 is a screen for selecting a preferred color based on the color qualities of the color printhead in the printing system.

FIG. 6 is the color calibration selection screen in the preferred embodiment. To perform the color calibration of the inkjet printer, the pair of squares whose left and right half are most closely matched in color in the printed calibration sample of FIG. 5 is selected by pointing and clicking next to the letter corresponding to the best matched pair, then selecting "Done" from the bottom of the screen as shown in FIG. 6. Alternatively, "Cancel" can be selected to abort the color calibration procedure.

Figure 7:
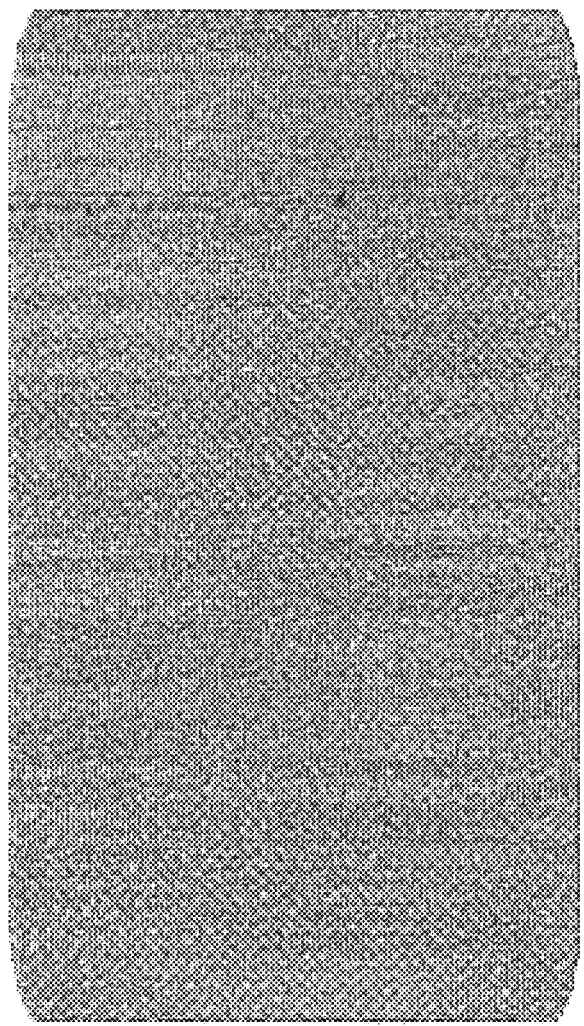
FIG. 7 is a color output of a calibration sample of an alternate embodiment printed by an inkjet printer upon request to calibrate color.

The calibration sample of FIG. 5 of the preferred embodiment has nine pairs of squares, but it is possible that different numbers of various calibration shapes could be used in the calibration sample. FIG. 7 is an example of an alternate embodiment where the calibration sample has only one calibration shape that could be evaluated by querying the user for preferences related to this one sample. For example, it could be asked, "Is the sample more blue than gray?" If the user replied "yes", then the drop quantity of the Cyan printhead could be compensated to decrease the realized drop quantity of the Cyan printhead. And, the same question would be asked of the other two printheads until the user gets the desired shade of gray. Alternatively, the sample could be compared to a printed sample in a user's manual or other documentation sent to the user with the inkjet printer.

Figure 8:
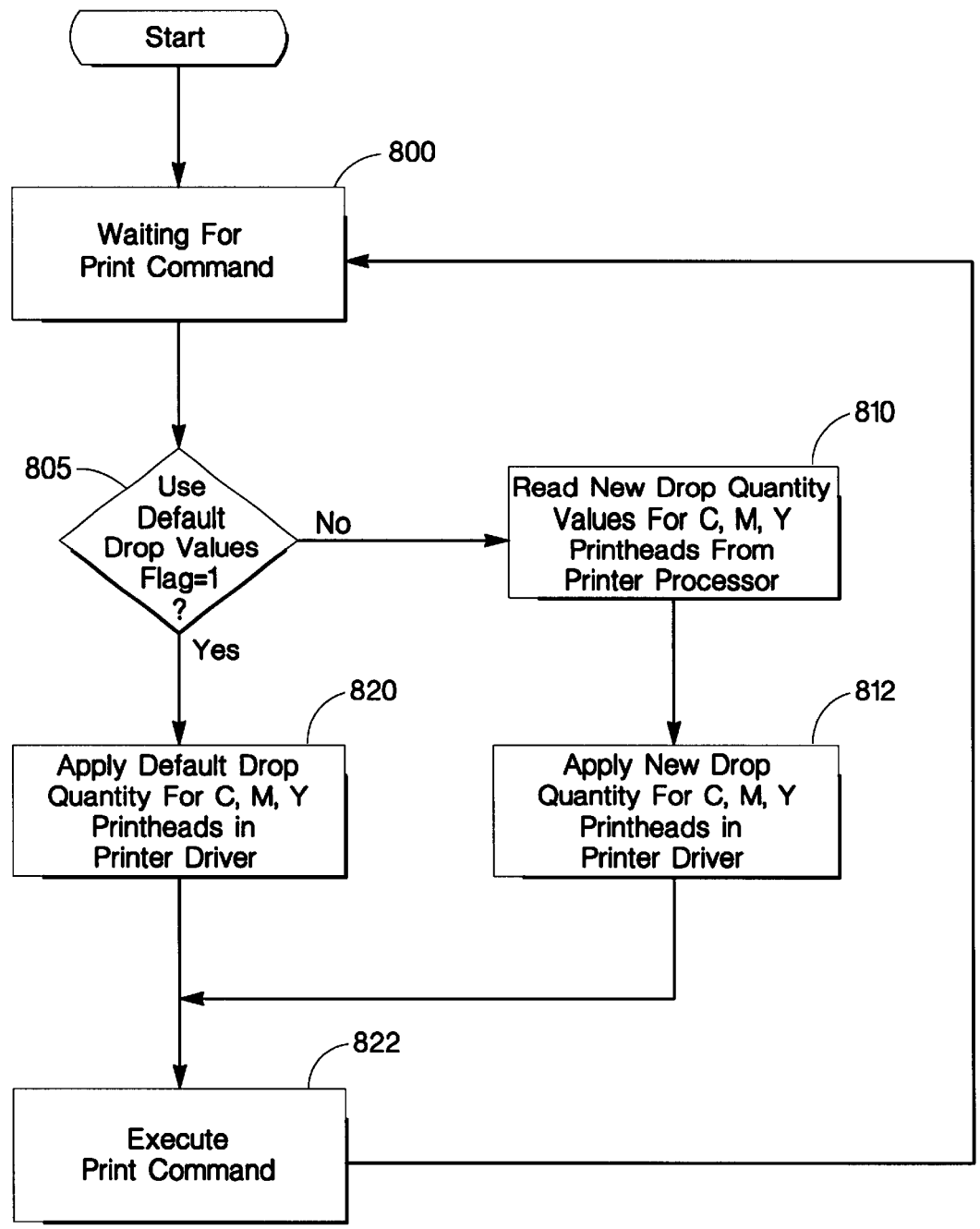
FIG. 8 is a representation of the flowchart of the printing sequence of the preferred embodiment of the present invention.

FIG. 8 is a representation of the flowchart of the printing sequence of the preferred embodiment of the present invention. With inkjet printer 130 (FIG. 1) connected to computer 101, printer 130 is waiting for a print command to be issued from the printer driver 104 as indicated by block 800. Control moves to block 805 where printer driver 104 reads its Use Default Drop Quantities Flag. If the Use Default Drop Quantities Flag is set to "1", as can be set in block 211 of FIG. 2, control moves to block 820 where printer driver 104 applies the default drop quantity values currently encoded in printer driver 104. Control moves to block 822 and the print command is executed. However, if the Use Default Drop Quantities Flat is set to "0", as can be set in block 221 of FIG. 2, control moves to block 810 where new drop quantity values are read from the printer control processor 131 which have changed due to either a calibration procedure (block 226 of FIG. 2) or insertion of a new printhead in inkjet printer 130. Control moves to block 812 where the new drop quantity values for the Cyan, Magenta and Yellow printheads are applied in printer driver 104 and the print command is executed as shown in block 822.

An alternate embodiment has been contemplated where printhead 120 does not have a printhead memory device 121 nor does ink supply 110 have an ink supply memory device 111. In this embodiment, if the color is found by the user to be unsatisfactory, a calibration procedure, similar to the procedure in the preferred embodiment, is executed and the drop quantity is compensated accordingly. To implement this procedure according to the flow chart of FIG. 2, blocks 212 and 214 are not necessary as there are no unique drop quantity values associated with each printhead, but a global default drop quantity value associated with a general class of printheads. The global value would typically be stored in printer driver 104.

In yet another alternate embodiment, printer 130 is a stand-alone printer that does not need computer 101 to be operational. In this embodiment, printer driver 104 is not in computer 101 but in printer 130.

What is claimed is:

1. A method for calibrating color in an ink jet printing system, comprising the steps of:

printing a color calibration sample using a combination of a plurality of colored inks in an inkjet printer;
   analyzing said color calibration sample; and
   selecting a color calibration based on said step of analyzing said color calibration sample.

2. The method of claim 1, wherein said color calibration sample is a single shape.

3. The method of claim 1, wherein said color calibration sample is a first shape, the method further comprising providing a second shape, wherein said first shape is a first color of gray constructed from the plurality of colored inks in combination, and said second shape is a second color of gray constructed from a black ink, wherein analyzing includes comparing said first color of gray of said first shape to said second color of gray of said second shape.

4. The method of claim 1, wherein said color calibration sample is a plurality of first shapes, the method further comprising providing a second shape, wherein each of said first shapes is a different color of gray constructed from the plurality of colored inks in combination, wherein the second shape is a second color of gray constructed from a black ink, wherein selecting the color calibration is based on selecting a preferred color of said first shape.

5. The method of claim 4, wherein analyzing includes selecting one of the first shapes based on which of the first samples is a closest matched color to the second sample.

6. The method of claim 1, wherein the step of selecting a color calibration further comprises the step of reducing a drop quantity of one of the plurality of colored inks that is to print said color calibration sample in said printing step.

7. The method of claim 6, wherein the step of selecting a color calibration further comprises the step of increasing a drop quantity of one of the plurality of colored inks that is to print said color calibration sample in said printing step.

8. The method of claim 1, wherein the step of selecting a color calibration further comprises the step of increasing a drop quantity of one of the plurality of colored inks that is to print said color calibration sample in said printing step.

9. The method of claim 1, wherein analyzing includes comparing a color of the color calibration sample to a known color.

10. A program storage medium readable by a computer, tangibly embodying a program of instructions executable by the computer to perform method steps for calibrating color in an inkjet printer, said computer having a printer driver for instructing said inkjet printer, said method steps comprising:

(a) when a determination is made to calibrate color of said inkjet printer from said computer, performing the following substeps:

(a.1) printing a color calibration sample using a combination of a plurality of inks in said inkjet printer, wherein a selection is made of a color preference from said color calibration sample, and (a.2) encoding said color preference in said printer driver by transmitting a signal representing the color preference to the printer driver.

11. The program storage medium of claim 10 wherein drop quantity values are encoded in said printer driver.

12. A printing system having an inkjet printer capable of receiving print commands and capable of printing a colored output, said inkjet printer comprising:

a printer driver, said printer driver further comprising a printing instruction set;
   an ink supply cartridge housing a plurality of inks;
   a printhead in fluid communication with said ink supply cartridge for producing said colored output with said ink; and a printer control processor for instructing said printhead based on said printing instruction set from said printer driver, wherein said colored output is calibrated by executing a calibration routine, said calibration routine comprising said inkjet printer printing a calibration sample using a combination of the plurality of inks, and selecting a color calibration from said calibration sample.

13. The printing system of claim 12, wherein said calibration sample is a single shape.

14. The printing system of claim 12, wherein said calibration sample is a first shape, the printing system further comprising a second shape, wherein said first shape is a color of gray constructed from the plurality of inks in combination, and the second shape is a color of gray constructed from a black ink, wherein said color calibration is selected based on a comparison of said color of gray of said first shape to said color of gray of said second shape.

15. The printing system of claim 12, wherein said calibration sample is a plurality of first shapes, wherein the printing system further comprises a second shape, wherein each of said first shapes is a different color of gray constructed from the plurality of inks in combination, wherein the second shape is a color of gray constructed from a black ink, wherein said color calibration is determined based on a preferred color of said first shape.

16. The printing system of claim 12, further comprising:

a computer having a CPU, wherein said printer driver is located in said computer.

17. The printing system of claim 12 wherein the calibration routine calibrates at least two of the plurality of inks according to the color calibration selected.

18. The printing system of claim 12, further comprising a monitor screen, wherein the monitor screen has at least one of a sample and a user prompt that corresponds with the printed calibration sample.

19. The system of claim 12 wherein selecting a color calibration includes increasing a drop quantity of one of the plurality of colored inks that is to print said color calibration sample.

20. The system of claim 12 wherein selecting a color calibration includes decreasing a drop quantity of one of the plurality of colored inks that is to print said color calibration sample.

21. A printed output having a plurality of drops of ink disposed thereon as a printed color calibration shape using a combination of a plurality of inks, said printed color calibration shape enabling a color calibration selection based on an analysis of said printed color calibration shape.

22. The printed output of claim 21, wherein said printed color calibration shape is a pair of color calibration shapes having a first shape and a second shape, wherein said first shape is a first color of gray produced from a black ink, and said second shape is a second color of gray produced from a plurality of colors of inks in combination, wherein said color calibration selection is based on a comparison of said first shape to said second shape.

23. An article comprising a computer readable medium having instructions stored thereon, which when executed, provides for color-calibrating an ink-jet printing system by:

printing at least one gray control sample using black ink;

printing, by combining a plurality of colored inks, at least one associated gray test sample for each gray control sample;

comparing the color of each gray test sample with its associated gray control sample; and selecting a color calibration for the ink-jet printing system based on the color comparison.

24. The article of claim 23, wherein the plurality of colored inks are Cyan, Magenta, and Yellow.

25. The article of claim 23, wherein each gray test sample is color shifted according to a drop quantity ratio of each of the plurality of colored inks.

26. The article of claim 25, wherein the drop quantity ratio is different for each gray test sample.

27. The article of claim 26, wherein there is a one-to-one ratio of gray test samples and gray control samples and wherein each gray test sample is printed adjacent to its associated gray control sample.

28. The article of claim 27, wherein the drop quantity ratio is achieved by holding a first of the plurality of colored inks to a constant drop quantity value in the gray test samples while remaining colored inks are varied incrementally in the gray test samples.

29. The article of claim 28, wherein at least one of the remaining colored inks varies incrementally above and below a drop quantity value desired to be equal to the relative constant drop quantity value.

30. The article of claim 26, wherein the comparing includes determining color shift of each gray test sample relative to its associated gray control sample.

31. The article of claim 30, wherein the selection of a color calibration is based on recognizing a gray test sample with a color shift less than a color shift of any other gray test sample.

32. The article of claim 23, wherein the selecting a color calibration further includes increasing the drop quantity of at least one of the plurality of colored inks.

33. The article of claim 23, wherein the selecting a color calibration further includes decreasing the drop quantity of at least one of the plurality of colored inks.

* * * * *